United States Patent [19]

Ibanez

[11] Patent Number: 4,826,250
[45] Date of Patent: May 2, 1989

[54] SEAT BELT SLACK ADJUSTING DEVICE

[76] Inventor: Antonio Ibanez, 6326 SW. 28th St., Miami, Fla. 33155

[21] Appl. No.: 194,884

[22] Filed: May 17, 1988

[51] Int. Cl.⁴ .................. A62B 35/00; B60R 21/10
[52] U.S. Cl. ................... 297/483; 24/171; 280/808; 297/468
[58] Field of Search .............. 280/808; 24/171; 297/483, 476, 468

[56] References Cited

U.S. PATENT DOCUMENTS

| | | | |
|---|---|---|---|
| 3,995,885 | 12/1976 | Plesniarski | 297/483 X |
| 4,294,467 | 10/1981 | Franton | 24/171 X |
| 4,371,192 | 2/1983 | Alix | 24/171 X |
| 4,406,043 | 9/1983 | Friedman | 24/171 |
| 4,461,510 | 7/1984 | Cunningham | 297/483 |
| 4,552,407 | 11/1985 | Takada | 297/476 |
| 4,679,282 | 7/1987 | Feng | 24/171 X |

FOREIGN PATENT DOCUMENTS 2437220  5/1980  France ............... 242/107.2

Primary Examiner—James T. McCall
Attorney, Agent, or Firm—J. Sanchelima

[57] ABSTRACT

A device for adjusting the slack of safety seat belts in vehicles. The device has a channel member that has substantially the shape of a flattened C and removably receives a rectangular block member therein leaving just sufficient space between these two members to pass the belt through. A centrally disposed elongated cavity on the surface of the block member that faces the channel member is provided with an internal slanted surface that, in cooperation with a locking member, exerts sufficient frictional pressure to maintain the device in a predetermined location in said belt.

4 Claims, 2 Drawing Sheets

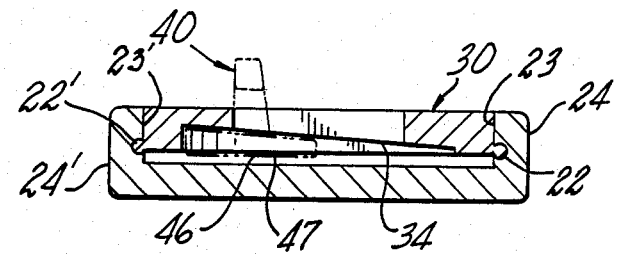
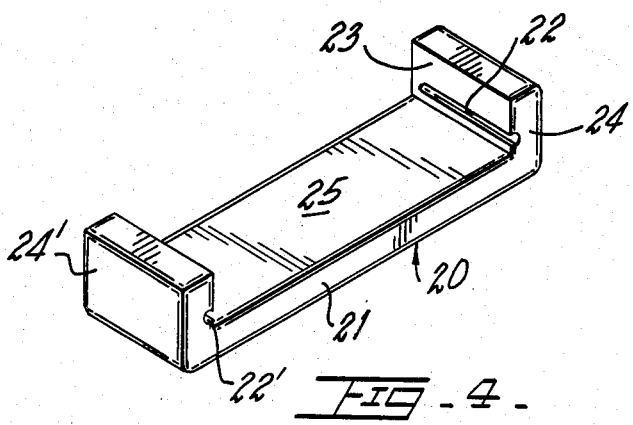
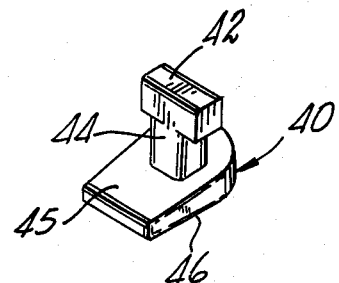
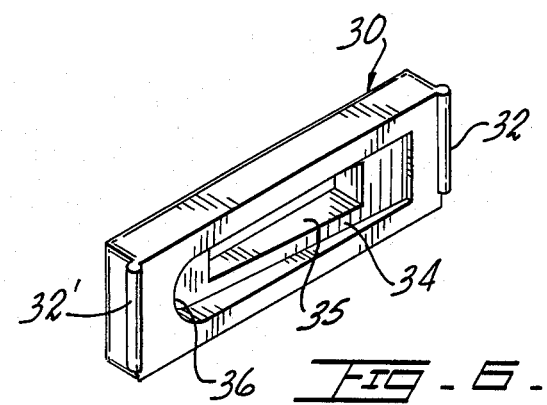

SEAT BELT SLACK ADJUSTING DEVICE

BACKGROUND OF THE INVENTION

1. Field of the Invention

The present invention relates to devices for adjusting the slack of seat belts as typically used in vehicles.

2. Description of the Related Art

It is not uncommon to hear drivers complaining about the seat belt restraining system and sometimes this nuisance prevents some drivers from buckling up. While a seat belt is a necessary safety device it does not necessarily have to be an uncomfortable device to wear.

Applicant believes that the closest reference corresponds to French patent No. 78-28314 issued to Guillotin in 1978 for a Safety Belt Tension Release Mechanism. This device utilizes a clamp that is snapped in place and then rotated to exert pressure against the belt. However, the clamp can be pulled out of its place easily thereby losing its efficiency.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device for adjusting the slack of seat belts.

It is another object of this present invention to provide such a device that is reliable and easy to maintain.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates a cross-sectional view of the device shown in FIG. 2.

FIG. 4 is a view in perspective of the channel member.

FIG. 5 is a representation in perspective of the locking member.

FIG. 6 shows a view in perspective of the cooperating lock member.

DETAILED DESCRIPTION OF THE PREFERRED EMBODIMENT

Figure 1:
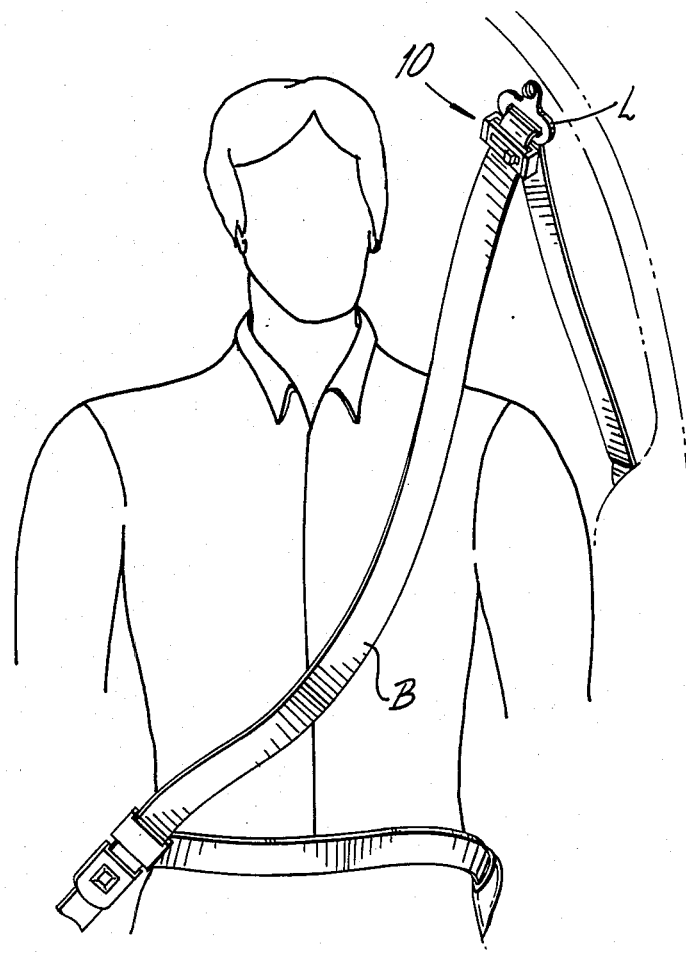
FIG. 1 represents a typical driver or passenger in an automobile using a conventional seat belt with a device according present invention installed.
Figure 2:
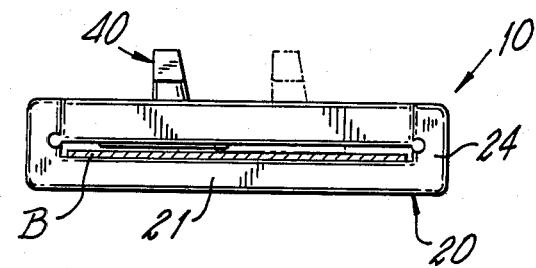
FIG. 2 shows an elevational side view of the present invention showing the two positions for the locking member.

Referring now to the drawings, where the present invention is generally referred to with numeral 10, it can be observed that it is a relatively small device that is installed on a typical seat belt restraining device at a point adjacent to the loop through which seat belt B is passed. To use it, seat belt B is placed in the trough of channel member 20 and the seat belt is sandwiched between surface 25 of channel member 20 and cooperating block member 30, as best seen in FIGS. 3; 4; 5 and 6. Locking member 40 is slidably mounted between seat belt B and cooperating block 30 so that it can be moved from the lock to the unlock position, and visa versa. This way, device 10 is frictionally held in place at a predetermined position on seat belt B and, depending on the users' desires, a slack on the seat belt will be given when device 10 hits loop L, as shown in FIG. 1. Loop L is conventionally found in most modern vehicles.

As it can be best seen in FIG. 4, channel member 20 has substantially a flattened C-shape and it includes an elongated rectangular plate 21 bottom surface 25 and two perpendicularly disposed end walls 24 and 24'. End walls 24 and 24' include transversal grooves 22 and 22' which extend almost the entire length of interior surface 23 and 23' of end walls 24 and 24'. As best seen in FIG. 6, cooperating block member 30 has substantially a rectangular cubical shape and it includes rib members 32 and 32' that cooperate with grooves 22 and 22' being substantially of the same dimensions, and removable insertable therein. A longitudinal cavity 36 is sufficiently large to receive wedge 46 locking member 40 as shown in FIG. 3. Opening 35 has preferably smaller dimensions than cavity 36 and is sufficiently large to allow actuator 46 and stem 44 through. Actuator 46 can only pass through opening 35 when it is aligned with the longitudinal axis of opening 35 and not when locking member 40 is in place thereby preventing it from falling off. Block 30 includes a slanted or inclined surface 34 against which upper surface 45 of wedge 46 slides. When locking member 40 is in non-locking position (FIG. 3) there is no constraining pressure exerted against belt B. When locking member 40 is pushed to the right, a frictional force is transmitted to seat belt B keeping it in place since the latter is trapped between bottom surface 47 of locking member 40 and surface 25. Wedge member 46 is rigidly mounted to stem member 44 that protrudes through cooperating block 30 and terminates with a lever or actuator 42. This facilitates the locking and unlocking of the seat belt B.

This simple mechanism is easy to install and remove from a seat belt with minimum effort on the part of the user. Also, the selection of the parts is such that it can be manufactured in high production lines without difficulties.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A device for adjusting the slack of safety seat belts, comprising:

A. a channel member having substantially a flattened C-shape including an elongated rectangular plate having two ends and comprising two end walls perpendicularly to said respective ends and said plate including a bottom surface;

B. a block member, having substantially the same length of said plate and removably mounted between said end walls at a spaced apart relationship with respect to said bottom surface so that said belt can pass through and said block includes a longitudinal cavity that includes a slanted surface;

C. a locking member having a wedge mounted to a stem member and said stem member including an actuator termination and said wedge slidably mounts between said slanted surface and said bottom surface.

2. The device set forth in claim 1 wherein said block member includes a through opening centrally disposed within said cavity and having such dimensions that allows said stem member through it.

3. The device set forth in claim 2 wherein said end walls include opposite interior surfaces each having transversal grooves running parallel to and at a spaced apart relationship with respect to said bottom surface and said block member includes a transversal rib at its ends and said ribs having such dimensions that are cooperatively and removably insertable within said grooves.

4. The device set forth in claim 3 wherein said lever includes an actuator termination on its end not connected to said wedge.

* * * * *